Patented Aug. 28, 1934

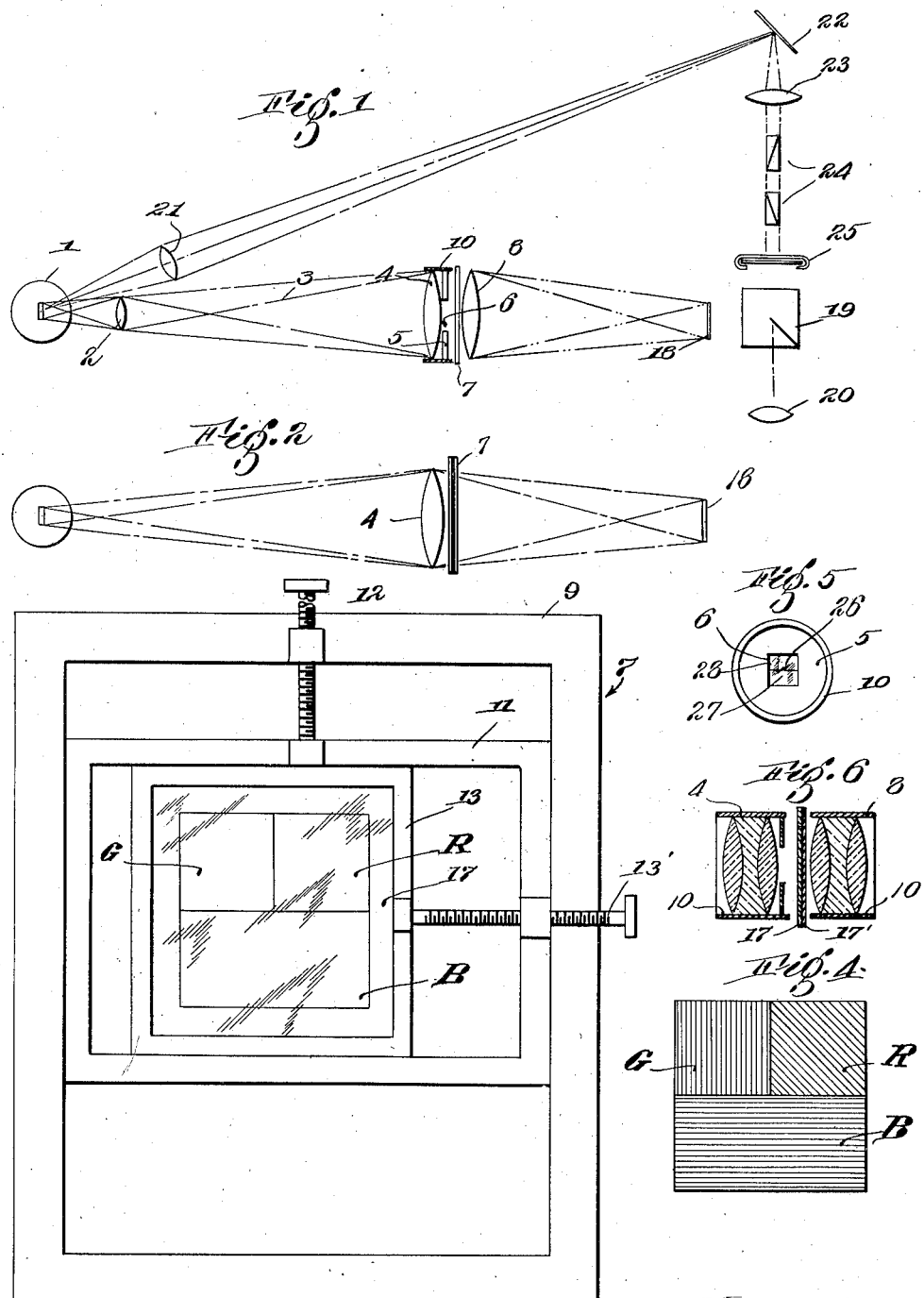

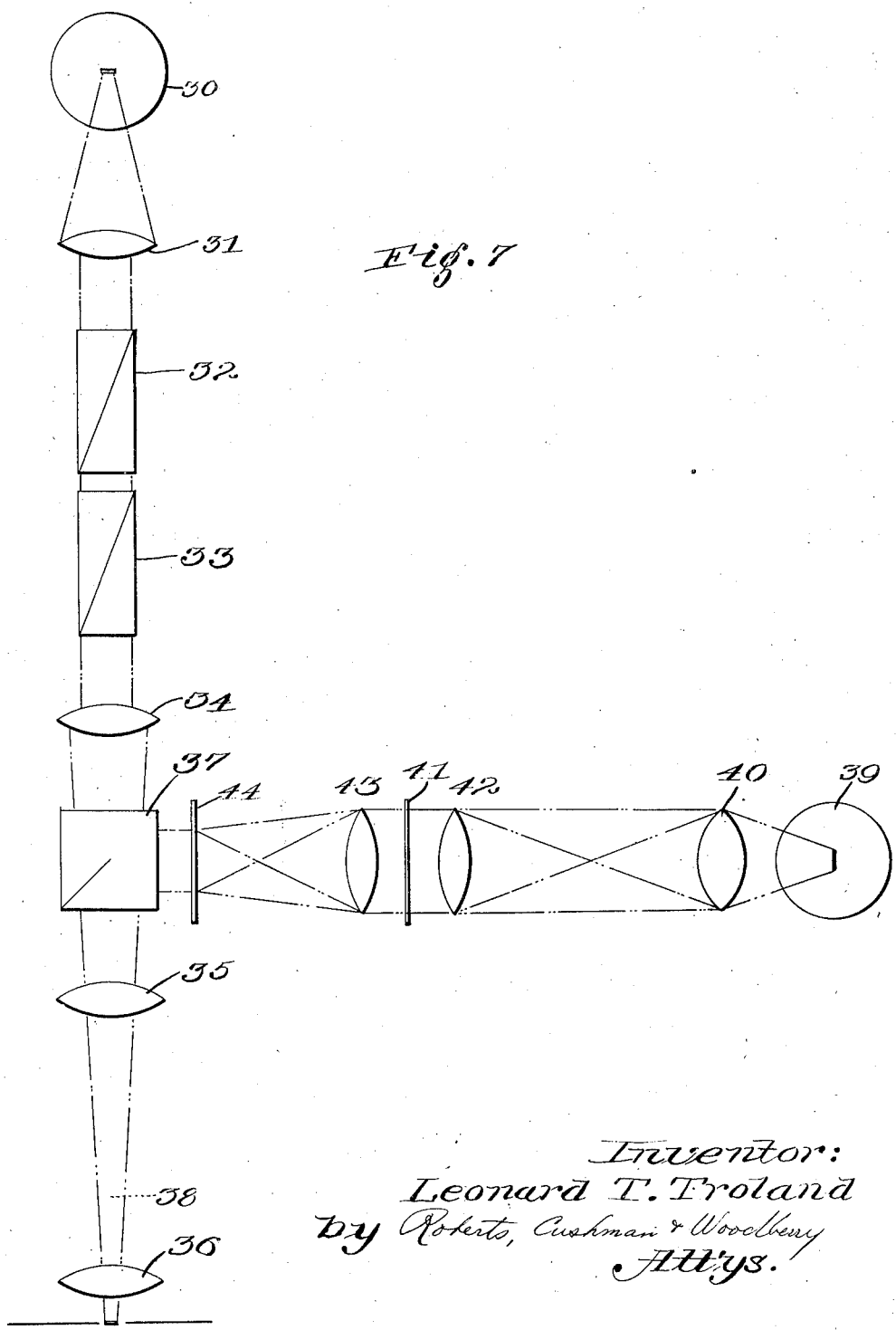

1,971,737

UNITED STATES PATENT OFFICE 1,971,737

MEANS FOR MEASURING COLOR VALUE

Leonard T. Troland, Cambridge, Mass., assignor, by mesne assignments, to Technicolor, Inc., New York, N. Y., a corporation of Delaware Application October 4, 1928, Serial No. 310,274

3 Claims. (Cl. 88—14)

This invention relates to means for measuring or comparing colors in terms of a standard color, the latter being variable and reproducible at will with respect to its color value and/or intensity.

In numerous aspects of the technical consideration of color and color values, it frequently becomes important to be able to measure the color of a given object in terms of either absolute or constant color standards or of a comparable color value, without complicated procedure or elaborate equipment and yet with sufficient exactitude for accurate reproduction purposes.

It is accordingly an object of this invention to provide suitable means for accomplishing such measurement and comparison of color values. Other objects will appear from the following disclosure.

The invention utilizes a uniformly bright optical image, for example that of a suitably uniform light source or of a lens surface illuminated by a light source, the image being formed upon the screen by a converging or double convex lens. A color filter made up of two or more differently colored components is inserted in the beam which forms this image, and is so located that the colored light from all parts of the filter is uniformly distributed throughout the image. The beam is restricted in cross section by a diaphragm which has an area that is fixed and independent of the filter adjustment. The image thus formed may be designated as the standard color image.

The colored object to be measured may be either in the form of a reflecting or transmitting surface and is so placed that it can be viewed in optical juxtaposition with the standard color image, and the degree of its illumination varied (as by nicol prisms) so that its apparent brightness is the same as that of the standard color image. The effective color value of the composite filter is then varied by adjusting the relative proportions of its several color components until the standard image is of the same color as the object to be measured. The relative values of the components of the color filter which are required to produce this result are noted and constitute an index of the color of the object. These relative values may be represented, for example, by the relative cross-sectional areas of the light beam which are occupied by the several color filter components.

Means suitable for accomplishing the invention may include one or more brilliant sources of light, lenses or optical systems for forming the necessary images, a transparent or reflecting composite color filter inserted in the light path, and a translucent screen such as an opal glass for receiving the standard color image. The sample color which is to be measured may be juxtaposed with the standard color by employing a Lummer-Brodhun photometric cube which reflects either the standard image or the light from the sample, while transmitting the other light through an adjacent area. The sample color may be viewed directly or after transmission through a lens system or, if desired for purposes of diffusion, through a ground glass plate.

The invention will be specifically described with reference to typical apparatus as illustrated by the accompanying drawings, in which:—

Fig. 1 is a diagrammatic illustration of a preferred embodiment of the apparatus of the invention with two double convex lenses;

Fig. 2 is a diagram of the essential elements of the apparatus in their simplest form;

Fig. 3 is a detail view of the color filter and means for positioning and adjusting the same;

Fig. 4 is a view of the color filter showing the arrangement and relative disposition of the color areas of a filter; e. g. containing red, blue and green sections;

Fig. 5 is a detail view of a diaphragm for limiting the beam of light to the cross section of the aperture therein and showing a portion of the color filter in registry therewith;

Fig. 6 is a cross section of the color filter, diaphragm and a pair of compound lenses, suitable for use in place of the lenses of Fig. 1; and Fig. 7 is a diagrammatic illustration of another embodiment of the invention in which direct lighting is employed.

Referring to Fig. 1, a light source 1 may be provided such as an incandescent bulb containing a tungsten ribbon filament which is characterized by emitting a substantial area of light, relatively uniform in intensity and reproducible at will, when a predetermined electrical potential is impressed. The light source is placed at or near the focus of a small double convex lens 2.

The image of the incandescent ribbon filament is enlarged by the lens somewhat as indicated by the lines 3. At a location on the opposite side of lens 2, a second double convex lens 4 is placed, preferably perpendicular and symmetrical with respect to the axis of the first, and at such a distance that its area is substantially or completely illuminated by the image of the light source 1.

On either side of either lens 4 or lens 8 may be provided an opaque diaphragm 5 having an aperture 6, preferably square and symmetrically disposed with respect to the axis of the lens, and a light filter 7. Both the diaphragm and filter are fixed in close juxtaposition to the surface of the adjacent lens. The diaphragm (Fig. 5) may consist of a brass disc having a square opening 6 in the center and secured in the customary mounting 10 of the lens, as by screw threading the periphery.

The filter may be made from suitably colored sections of transparent material such as colored glass, dyed gelatine or celluloid, or the like. They may be of uniform light absorption throughout their several areas or graded into sections of different light absorptions or light intensity coefficients, or different shades of color and color values, as desired. Typically, however, the filter contains two or more colored areas, usually complemental such as the sections R, B and G, which are preferably red, blue and green (Figs. 3 and 4) and which may be so adjusted as to bring any required proportion of each section into registry with the aperture 6 of the diaphragm (Fig. 5).

The preferred form of the filter is shown in Fig. 3. It utilizes three separate color areas, one of which constitutes one-half of the rectangular area while the other two form the remaining half. The first one is preferably blue, while the other two are red and green respectively. This arrangement provides for a variation from red to green by adjustment of the filter pattern across the diaphragm 6 in one direction and for a variation between yellow (red and green) and blue by similar adjustment in a direction at right angles to the first mentioned direction. If the directions of movement are made parallel to the boundaries between the filters, the red-green setting becomes independent of the blue-yellow one.

As shown in Fig. 3, the color filter may be mounted in a fixed vertical supporting frame 9. Mounted in the frame 9, for slidable vertical movement, is a second frame 11. A thumb screw 12 passing through frame 9 and engaging frame 11 permits of accurate movement and adjustment of the latter. A third frame 13 is mounted for sliding horizontal movement in the frame 11 and is adjustably controlled by a thumb screw 13' passing through frame 11.

Frame 13 thus serves to carry the color filter 7 which may, for example, comprise a sheet of glass 17 upon which the transparent elements, e. g., red, blue and green films, R, B and G respectively, are secured as by adhesive tape across the outer corners, or by Canada balsam or other transparent adhesive material, or by using two glass plates 17, 17' (Fig. 6) with the films compressed between them. Each section of the color filter should be sufficiently large to entirely cover the aperture 6, and all are preferably arranged to meet at a common point. The frame 9 is so positioned, with the color filter aligned with the aperture 6 of diaphragm 5, that any section of the filter 7 may be brought into registry with the aperture by vertical adjustment of the frame 11 and/or horizontal adjustment of the frame 13.

At or near the focal point of lens 4 or lens 8 (or of lenses 4 and 8 when used together) is placed a screen 18 which may serve as the observation screen or may be made of translucent or transparent material such as opal glass, to permit the image light to pass through and fall upon the mirror of a reflecting prism 19, and thence be reflected to the observer's eye piece 20.

The color to be tested or compared may be illuminated by the same source of light 1 as the color image by means of lens 21 and reflecting mirror 22 from which the light may pass through the object 25 and through prism 19 to eye piece 20.

In order to control the light intensity from the color to be tested, a pair of rotatable nicol prisms 24 may be introduced in the path of the image light and adjusted until the juxtaposed images are substantially equivalent in this respect.

In operation the ribbon filament 1 is preferably heated to incandescence by means of a constant source of direct current. The light beam is directed to the first lens 2, preferably along the axis and so that the transmitted image shall strike the lens 4 and fall upon the diaphragm 5 symmetrically with respect to the aperture 6 therein. The aperture thus confines the image light which shall fall upon the color filter 7 to that portion which is in registry with aperture 6.

Upon passing through the color filter the restricted beam of light is selectively absorbed in the several parts of the exposed area, transmitting zones of colored light (red, blue and green) differing in cross-sectional area according to the relative proportion of the aperture which such portions of the color filter in registry therewith occupy.

The two or more differently colored components or zones (red, green and blue) of the beam are converged by lens 4 (or 4 and 8) to form an image on the screen 18 in which each component is uniformly distributed throughout the image, yielding a composite color equal to their aggregate value. This image is transmitted through the opal glass screen 18 and is reflected from the 45° mirror in the reflecting prism 19 through the observer's eye piece 20.

The object to be measured (which may be illuminated by reflected or transmitted light) is positioned at 25 and illuminated by a beam of light from the source 1 passing through lens 21, mirror 22, lens 23, nicol prisms 24, sample 25, directly through prism 19 and to eye piece 20, as above set forth. The nicol prisms 24 are then adjusted until the general luminosity of both images of the light source 1 are equivalent. The color filter is then adjusted by vertical and horizontal movements until the relative proportions of its several light components, in registry with the aperture 6, produce a light image on mirror 19 which matches the object or object image, as seen through the eye piece 20.

By observing the position of the filter, and from this the relative proportion of each component in registry with the aperture 6 of the diaphragm, the composition of the standard color image may be determined and may be reproduced readily and with certainty.

In the direct lighting arrangement of apparatus shown in Fig. 7, rays from the lamp 30 are collimated by a lens 31 passing through two nicol prisms 32 and 33 as a parallel beam. They are then concentrated by the lenses 34 and 35 upon the eye piece 36 so as to form an image of the lamp filament. At the same time lens 35 serves to form a sharp image of the separation line of the prisms 37 in the image plane 38. The eye piece 36 is so adjusted that the observer sees this image sharply defined at 38. This arrangement has two advantages: (1) that the boundary line between the two fields is sharply defined in the same optical plane as the circumferential boundary line of the entire field: and (2) that an extremely high intensity of light is available for illuminating the color or sample that is being placed between the lens 34 and prism 37. This high intensity is secured by focusing the lamp filament upon the observer's eye.

An image of the ribbon filament in the lamp 39 is formed by the lens 40 in the plane of the filter 41 lying between the lenses 42, 43. The two lenses 42 and 43, in turn form an image of the aperture of 40 on the opal glass plate 44.

From Figs. 3 and 4 it will be evident that the right boundary of section G and the left boundary of section R extend side by side in the vertical dimension, the lower boundaries of these two sections extend to the right and left respectively in the horizontal dimension, and the upper rectilinear boundary of section B extends in the horizontal dimension, whereby the proportion of the blue color is unaffected by horizontal adjustment and the ratio between the red and green is unaffected by vertical adjustment, this being true whether the red and green overlap, are spaced apart or just meet, and also whether the blue overlaps or is spaced from or just meets either or both of the other colors. By making the filter components of the same light transmissivity the brilliancy of the comparison color image is unaffected by variation in the ratio of the components.

I claim:

1. A colorimeter comprising a light source, a condensing lens, a diffusing screen, means for forming an image of the light from the condensing lens upon the screen, a composite color filter introduced into the beam of light between the source and the screen to occupy the entire cross section of the beam and impart the color or colors of the filters in uniform distribution throughout the image, the boundaries of the differently colored areas of the filter substantially meeting at a point, means for varying the proportionate values of the filter components, and means for viewing the sample to be tested in optical adjacency to the image.

2. A colorimeter comprising a light source, a diaphragm, a lens between and in optical alignment with the source and diaphragm, and a composite light filter formed of juxtaposed areas of different colors substantially meeting at a point and adjustably mounted in the region of the diaphragm to occupy the entire cross section of the diaphragm aperture and impart the colors of the filter components in uniform distribution throughout an image which is thus variable in color.

3. A colorimeter comprising a light source, a diaphragm, a lens between the light source and diaphragm, a composite light filter mounted in the region of the diaphragm and formed of three juxtaposed areas of different colors substantially meeting along two lines transverse to each other, means for adjusting the filter along one line to vary the proportion of two colors independently of the third color, and means for adjusting the filter along the other line to vary the proportion of the third color relatively to the first two colors without varying the proportions of the first two colors relatively to each other.

LEONARD T. TROLAND.